US008298669B2

(12) United States Patent
Kawano

(10) Patent No.: US 8,298,669 B2
(45) Date of Patent: Oct. 30, 2012

(54) COATED CARRIER COMPRISING A MAGNETIC CORE AND PARTICULATE RESIN INTERLAYERED COATING, AND METHOD OF MANUFACTURING COATED CARRIER

(75) Inventor: Yui Kawano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 359 days.

(21) Appl. No.: 12/783,138

(22) Filed: May 19, 2010

(65) Prior Publication Data

US 2010/0304144 A1 Dec. 2, 2010

(30) Foreign Application Priority Data

May 26, 2009 (JP) ................................ P2009-127067

(51) Int. Cl.
*B32B 5/16* (2006.01)
*G03G 9/107* (2006.01)
*G03G 9/113* (2006.01)

(52) U.S. Cl. ..................... 428/407; 427/221; 430/106.1; 430/110.2; 430/111.3; 430/111.32

(58) Field of Classification Search .......... 428/403–407; 430/106.1, 110.2, 111.3, 111.32, 111.35; 427/221

See application file for complete search history.

(56) References Cited

U.S. PATENT DOCUMENTS

| | | | | |
|---|---|---|---|---|
| 5,670,287 | A | 9/1997 | Kawata et al. | |
| 6,124,067 | A * | 9/2000 | Mikuriya et al. | 430/100 |
| 6,447,968 | B1 * | 9/2002 | Ohno | 430/106.2 |
| 6,500,595 | B1 | 12/2002 | Mochizuki et al. | |
| 6,828,075 | B2 * | 12/2004 | Suzuki et al. | 430/111.1 |
| 7,384,719 | B2 * | 6/2008 | Yamashita et al. | 430/108.1 |
| 7,521,164 | B2 * | 4/2009 | Nakayama et al. | 430/111.4 |
| 7,527,908 | B2 * | 5/2009 | Iwatsuki et al. | 430/111.1 |
| 2005/0238980 | A1 * | 10/2005 | Yamashita et al. | 430/108.1 |
| 2006/0251982 | A1 * | 11/2006 | Iwatsuki et al. | 430/111.1 |

FOREIGN PATENT DOCUMENTS

| | | |
|---|---|---|
| JP | 4-177369 | 6/1992 |
| JP | 6-332267 | 12/1994 |
| JP | 8-44118 | 2/1996 |
| JP | 2001-117287 | 4/2001 |

* cited by examiner

*Primary Examiner* — Hoa (Holly) Le
(74) *Attorney, Agent, or Firm* — Nixon & Vanderhye, P.C.

(57) ABSTRACT

A coated carrier that peeling and wearing of a coating layer are hard to be generated and a method of manufacturing the coated carrier are provided. The coated carrier includes a core particle including a magnetic body, a first resin layer coating the core particle, a resin particle layer including a resin particle fixed to the first resin layer as a single layer, and a second resin layer. The first resin layer includes a first resin having a first reactive group. The resin particle layer is formed of resin particles including a cross-linking resin having a second reactive group which can undergo a cross-linking reaction with the first reactive group. The second resin layer is provided so as to fill gaps between the resin particles.

5 Claims, 2 Drawing Sheets

COATED CARRIER COMPRISING A MAGNETIC CORE AND PARTICULATE RESIN INTERLAYERED COATING, AND METHOD OF MANUFACTURING COATED CARRIER

CROSS-REFERENCE TO RELATED APPLICATION

This application claims priority to Japanese Patent Application No. 2009-127067, which was filed on May 26, 2009, the contents of which are incorporated herein by reference in its entirety.

BACKGROUND OF THE INVENTION

1. Field of the Invention

The present invention relates to a coated carrier and a method of manufacturing the coated carrier.

2. Description of the Related Art

There has been used a two-component developer composed of a small particle size toner having a volume average particle size of 5 to 7 μm and a small particle size carrier having a volume average particle size of 30 to 40 μm in an image forming apparatus using electrophotography. In order to make durability and environmental stability of the two-component developer excellent, it is important to charge a developer stably in the image forming apparatus. Therefore, for development of carriers, searching of core materials and coating resin materials constituting a carrier and optimization of coating amount have been performed.

A color developer described in Japanese Unexamined Patent Publication JP-A 4-177369 (1992) is a developer containing a no, magnetic color toner and a carrier and contains a carrier whose carrier core is coated with an electrically insulating resin of 0.1 to 5.0% by weight.

Additionally, a magnetic carrier described in Japanese Unexamined Patent Publication JP-A 8-44118 (1996) is composed of a magnetic core particle and a resin coating layer, and the resin coating layer is mainly formed of a thermoset resin. In Japanese Unexamined Patent Publication JP-A 8-44118, a thermoset resin such as a silicone resin, a thermoset acrylic resin, a phenolic resin, an urethane resin, or a thermoset polyester resin is used, and thereby making adhesiveness and wear resistance of a resin coating layer excellent. As a result, a carrier has a durable structure as a whole.

However, even in the case of a carrier using a thermoset resin for a coating layer, there still remains a problem that the coating layer comes off and carrier characteristics change due to a long period of use. In particular, in a small particle size toner, an external additive having relatively large particle size of 100 to 300 nm is often used. In such a case, the coating layer on a carrier surface is polished by the external additive, and therefore carrier characteristics in an initial state can not be maintained, thus lowering durability of the carrier.

Such a method is possible to handle the above mentioned problem that the coating layer is thickened and thereby the carrier characteristics are not influenced even in a case where the coating layer is worn away, however, in the method, there is a problem such that it becomes difficult to control so that thickness is uniform along with thickening the coating layer, for example, when a core material is coated with the thermoset resin, several pieces of carriers aggregate, the aggregated carriers are disintegrated, thus generating a fracture surface on the coating layer.

SUMMARY OF THE INVENTION

An object of the invention is to provide a coated carrier excellent in wear resistance that peeling and wearing are hard to be generated and a method of manufacturing the coated carrier.

The invention provides a coated carrier comprising:

a core particle including a magnetic body;

a first resin layer including a first resin having a first reactive group, the first resin layer coating the core particle;

a resin particle layer fixed to the first resin layer as a single layer, the resin particle layer being formed of resin particles comprising a cross-linking resin having a second reactive group which can undergo a cross-linking reaction with the first reactive group; and a second resin layer provided so as to fill gaps between the resin particles.

According to the invention, the resin particles forming the resin particle layer is firmly fixed by a cross-linking reaction with the resin contained in the first resin layer, and further the second resin layer is provided so as to fill gaps between the resin particles forming the resin particle layer, so that it is made possible to suppress detachment of the resin particles. Therefore, a coated carrier having a uniform and thick coating layer can to be obtained. Further, since a hard resin particle is included in the coating layer, it is possible to slow progression of wearing the coating layer due to friction between coated carriers or between a coated carrier and a member of a developing apparatus, thus the coated carrier excellent in wear resistance can be obtained.

Additionally, in the invention, it is preferable that the second resin layer includes a second resin having the first reactive group.

According to the invention, the first reactive group included in the second resin layer and the second reactive group included in the resin particles undergo the cross-linking reaction, and thereby the second resin layer is more firmly fixed and wear resistance of the coated carrier is improved.

Further, in the invention, it is preferable that one of the first resin having the first reactive group and the cross-linking resin having the second reactive group is an acrylic resin having a glycidyl group and the other thereof is an acrylic resin having a carboxyl group.

According to the invention, due to a cross-linking reaction of the glycidyl group and the carboxyl group, adhesiveness between the resin coating layers and the resin particles is strengthened, the resin particles are prevented from detaching from a coated carrier surface due to friction between the coated carriers or between the coated carrier and the member of the developing apparatus, thus the coated carrier excellent in peeling resistance can be obtained.

Further, the invention provides a method of manufacturing a coated carrier comprising:

a first resin layer forming step of forming a first resin layer including a first resin having a first reactive group, on a surface of a core particle including a magnetic body;

a resin particle layer forming step of forming a resin particle layer on a surface of the first resin by fixing resin particles comprising a cross-linking resin having a second reactive group which can undergo a cross-linking reaction with the first reactive group, to the first resin layer as a single layer; and a second resin layer forming step of providing a second resin layer so as to fill gaps between the resin particles.

According to the invention, since isolation of the resin particles contained in the coated carrier is suppressed, it is possible to obtain a coated carrier which does not impair fixing properties of a toner.

Further, in the invention, it is preferable that 90% or more by number of resin particles to be used have a particle size which is 0.8 times or more and 1.2 times or less as much as the number-average particle size.

Further, according to the invention, since particle sizes of the resin particles are even, even if the coating layer is made thicker, a coated carrier in which generation of disintegrated surfaces is little, and thickness of the coating layer is uniform.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
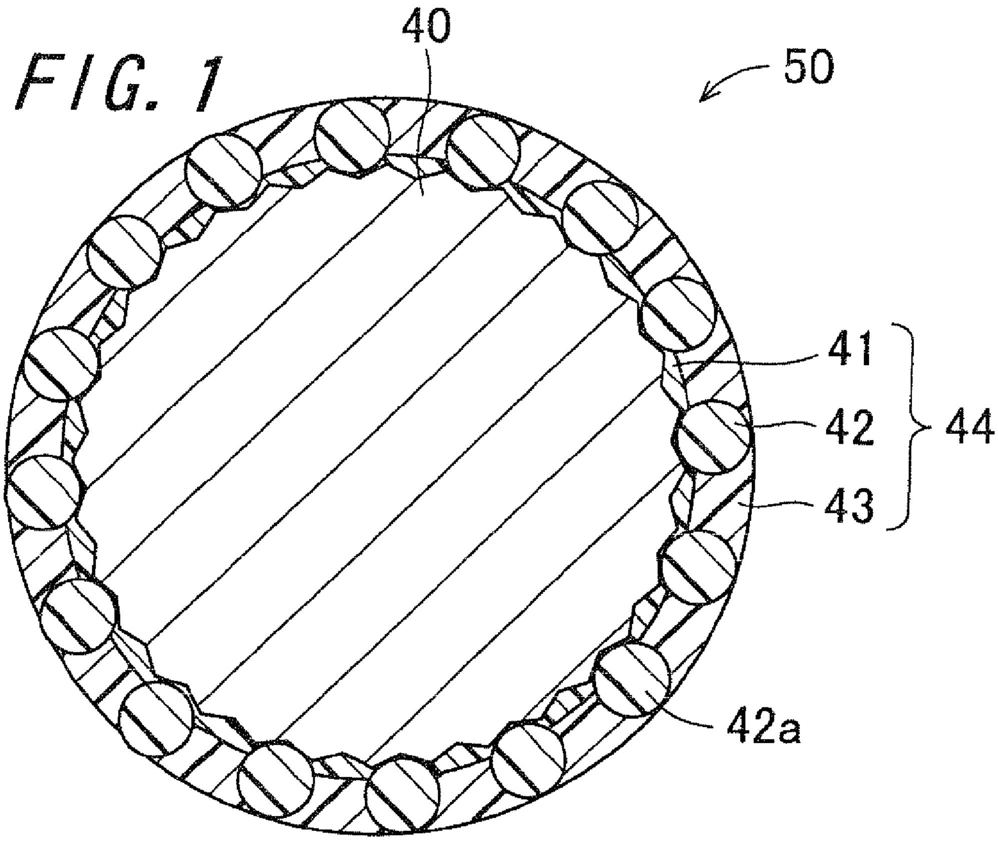
FIG. 1 is a schematic drawing showing a configuration of a coated carrier according to an embodiment of the invention.

Now referring to the drawings, preferred embodiments of the invention are described below.

1. Configuration of Coated Carrier

FIG. 1 is a schematic drawing showing a configuration of a coated carrier 50 which is an embodiment of the invention. The coated carrier 50 of the embodiment comprises a core particle 40 including a ferrite particle, and a coating layer 44 including a first resin layer 41, a single-layer resin particle layer 42 comprised of resin particles 42*a* and a second resin layer 43.

(1) Core Particle

Known magnetic particles are usable for the core particle 40, and among them, ferrite-based particles containing a ferrite component are preferable. The ferrite-based particles have high saturation magnetization, therefore it is possible to obtain a coated carrier having low density. Accordingly, adhesion of the coated carrier to a photoreceptor is hard to occur, a soft magnetic brush is formed, thus an image having high dot reproducibility can be obtained.

Usable examples of the ferrite-based particles include known substances such as zinc-based ferrite, nickel-based ferrite, copper-based ferrite, nickel-zinc-based ferrite, manganese-magnesium-based ferrite, copper-magnesium-based ferrite, manganese-zinc-based ferrite, and manganese-copper-zinc-based ferrite.

The ferrite-based particles can be manufactured by the known method. For example, ferrite raw materials such as $Fe_2O_3$ and $Mg(OH)_2$ are firstly mixed and then, mixed powder thus obtained is heated in a heating furnace to be calcined. Next, the calcined product thus obtained is cooled down and then pulverized by a vibrating mill into particles of approximately 1 μm. To pulverized powder thus obtained, a dispersant is added, resulting in a slurry. Subsequently, the slurry obtained is wet-pulverized by a wet ball mill, and suspension thus obtained is granulated and dried by a spray drier. The ferrite-based particles can be thus obtained.

(2) First Resin Layer

The first resin layer 41 includes a first resin having a first reactive group, coats a surface of the core particle 40, and retains the resin particles 42*a* as a single-layer resin particle layer. As a thickness of the first resin layer 41, ¼ to ½ of the particle size of the resin particles 42*a* is preferable, and specifically 0.5 to 1 μm is appropriate.

<First Resin Having First Reactive Group>

As the first resin having the first reactive group contained in the first resin layer 41, acrylic resin having the first reactive group at a side chain or at the end of a main chain, a styrene-acrylic copolymer resin, a styrene-acrylic block polymer resin, etc., are usable, and the first resin can be obtained by copolymerizing or block-polymerizing a monomer having the first reactive group and another monomer.

In the invention, the first reactive group is a reactive group capable of reacting with the second reactive group which will be described below, and for example, includes a glycidyl group, a carboxyl group, an isocyanate group, an amine group, and a hydroxyl group.

Moreover, it is preferable to add a cross-linking agent capable of reacting with the first reactive group, for example, such as a diamine compound and a dial compound so that the first resin layer 41 is not peeled off with a solvent when forming the second resin layer 43.

As the first resin contained in the first resin layer 41, one having an acrylic-type resin structure or a styrene-acrylic-type resin structure is particularly preferable in consideration of reaction control properties, properties design, and cost, and specifically an acrylic resin having a glycidyl group or a carboxyl group to be the cross-linking agent.

The acrylic resin having the glycidyl group is normally obtained by polymerizing a monomer having a polymerizable double bond and a monomer having the glycidyl group and a double bond. A monomer having the glycidyl group includes a glycidyl acrylate, α-glycidyl acrylate, a β-methylglycidyl methacrylate, and a glycidyl methacrylate.

The acrylic resin having the glycidyl group preferably has an epoxy equivalent of 100 g/Eq or more and 2000 g/Eq or less. When the epoxy equivalent falls within this range, the resin particle 42*a* is firmly fixed at a resin particle layer forming step which will be described below.

Note that, the epoxy equivalent means mass (the number of g) of an epoxy resin per 1 gram-equivalent weight of an epoxy group. The epoxy equivalent was obtained by a hydrochloric acid-dioxane method (Hiroshi Kakiuchi, "EPOXY RESIN", p 161-164, published by SHOKODO, CO., LTD.)

The acrylic resin having the carboxyl group can be obtained by polymerizing the monomer having the polymerizable double bond and a monomer having the carboxyl group and a double bond.

Examples of a monomer having the carboxyl group include acrylic acid, methacrylic acid, maleic acid, fumaric acid, and cinnamic acid.

The acrylic resin having the carboxyl group preferably has an acid value of 10 to 300 KOHmg/g. When the acid value falls within this range, the resin particle 42*a* is firmly fixed at a resin particle layer forming step which will be described below.

Note that, the acid value is the number of mg of potassium hydroxide which is necessary for disacidify 1 g of resin, and a value measured in conformity with JIS K-5601-2-1.

Examples of a monomer having a polymerizable double bond include styrenes, acrylic acid esters, methacrylate esters and fumarate esters. Styrenes include a styrene, acrylic acid esters include methyl acrylate, ethyl acrylate and dimethylaminomethyl acrylate, methacrylate esters include methyl methacrylate and butyl methacrylate, and fumarate esters include dimethyl fumarate and dibutyl fumarate. Further, as the monomer having the polymerizable double bond, methacrylic amid, acrylic nitrile and the like may be used, other than the above compounds. Preferable monomers among them are styrenes, acrylic acid esters, methacrylate esters and the like.

As a method of polymerizing these compounds, suspension polymerization, emulsion polymerization, solution polymerization or the like is used.

(3) Resin Particle Layer

The resin particles 42*a* are fixed to the first resin layer as a single layer, and the resin particle layer 42 is formed on the surface of the first resin layer 41. In FIG. 1, the resin particles 42*a* are fixed to the first resin layer 41 in a partially-embedded state.

As the resin particle 42*a*, particulated cross-linking resin having the second reactive group capable of reacting with the first reactive group is usable. The second reactive group includes, for example, a glycidyl group, a carboxyl group, an isocyanate group, an amine group and a hydroxyl group. By using these cross-linking resin particles, a resin particle layer excellent in wear resistance and adhesion to the first resin layer 41 and the second resin layer 43 can be obtained.

The cross-linking agent, when considering reaction controllability, physical design and particle-size controllability, preferably has especially an acrylic resin structure and a styrene acrylic resin structure, and specifically, acrylic resin having the glycidyl group or the carboxyl group as the cross-linking agent is preferable.

The acrylic resin having the glycidyl group or the carboxyl group is obtained by polymerization of a monomer as described above, and dispersion polymerization, suspension polymerization, emulsion polymerization or the like is used as a polymerization method.

Further, as the resin particle 42*a*, it is preferable to use a cross-linking resin particle which is cross-linked by a cross-linking agent such as divinylbenzene so as to be not dissolved by a solvent at the time of being coated by the second resin layer 43.

The acrylic resin having a glycidyl group preferably has an epoxy equivalent of 100 g/Eq or more and 2000 g/Eq or less, similarly to the resin contained in the above-described first resin layer 41. The resin particle 42*a* is fixed firmly in the first resin layer 41 since the epoxy equivalent is in this range.

The acrylic resin having a carboxyl group preferably has an acid value of 10 to 300 KOHmg/g, similarly to the resin contained in the above-described first resin layer 41. When the acid value falls within this range, the resin particles 42*a* are fixed firmly in the first resin layer 41.

It is preferable that either one of the first resin having the first reactive group and the cross-linking resin having the second reactive group is an acrylic resin having a glycidyl group, and the other is an acrylic resin having a carboxyl group.

It is preferable that the cross-linking resin has a carboxyl group when using the acrylic resin having a glycidyl group in the first resin layer. It is considered that the first resin layer and the cross-linking resin have higher adhesiveness by a cross-linking reaction of a glycidyl group and a carboxyl group.

The particle size of the resin particles is selected according to thickness of a coating layer to be set, and for example, a particle having a volume average particle size of 1.5 to 5 μm is usable.

The more narrow particle size distribution of the resin particles is, the more uniform thickness of the coating layer is. Accordingly, it is preferable that the resin particle has 90% by number or more of a content rate of particles having a particle size falling within the range of 0.8 times or more and 1.2 times or less as much as the volume average particle size.

The coverage of the surface of the first resin layer 41 with the resin particles 42*a* is preferably 30 to 70%. In the case of less than 30%, the thickness of the coating layer is easy to be non-uniform, and in the case of exceeding 70%, gaps generate in the formation of the second resin layer 43, and strength of the coating layer is easy to be decreased.

(4) Second Resin Layer

The second resin layer 43 enhances binding force of the resin particles 42*a* by coating the surface of the first resin layer 41 as well as filling gaps of the resin particles 42*a*, and makes the surface of the coated carrier 50 smooth.

The thickness of the second resin layer 43 preferably is extent of coating the resin particles 42*a* mostly, the thickness of the coating layer 44 is preferably equal to the particle size of the resin particles 42*a*, and specifically 1 to 5 μm is suitable.

As a resin which is usable for the second resin layer 43, it is not particularly limited but preferable to use a resin having the same component as the resin contained in the first resin layer 41, in consideration of adhesion to the first resin layer 41.

Further, it is preferable to add a conductive agent such as carbon black and a charge control agent to the second resin layer 43 to adjust electrical resistance and chargeability of the carrier.

2. Method of Manufacturing Coated Carrier

Figure 2:
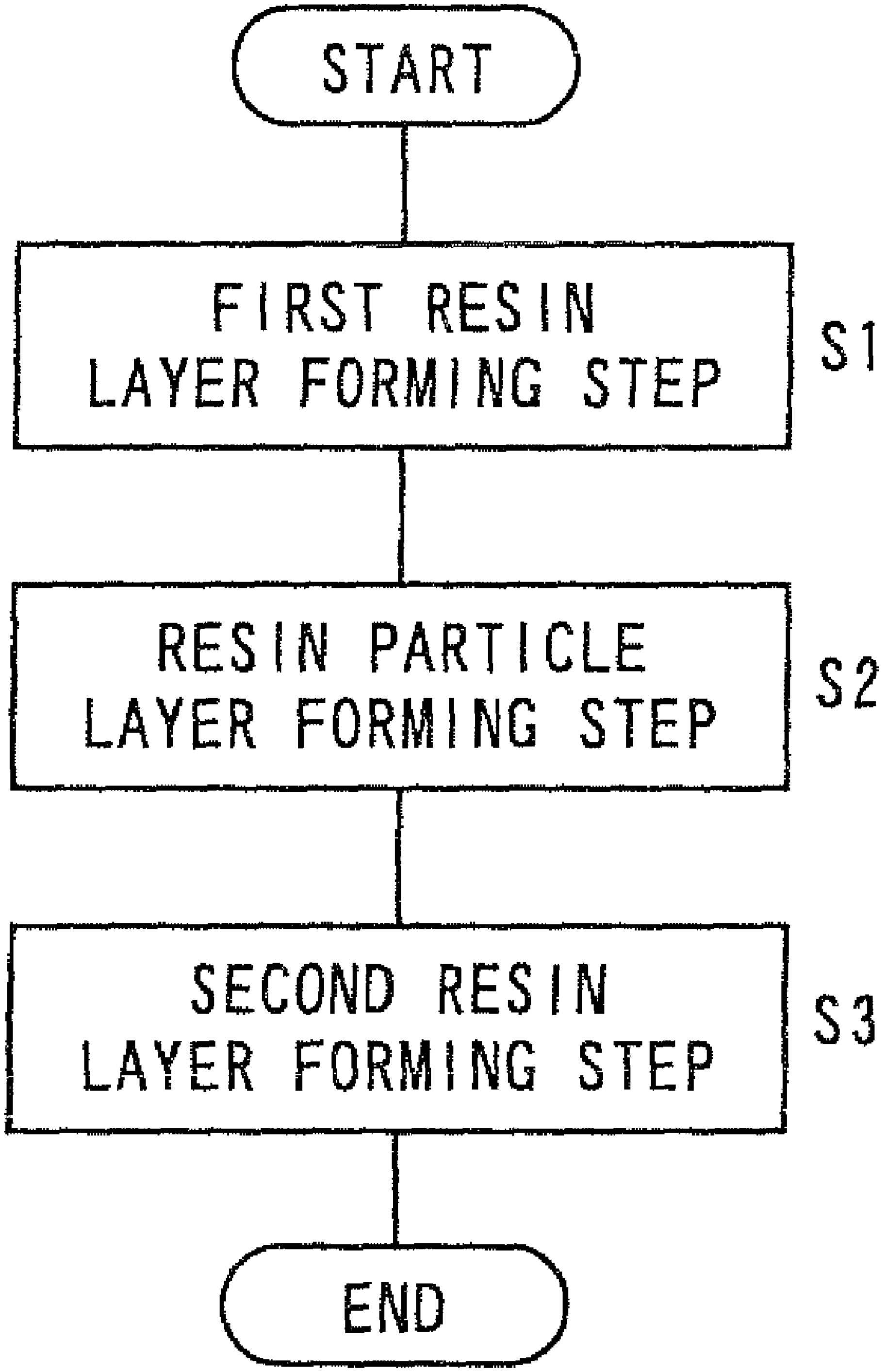
FIG. 2 is a flowchart showing a method of manufacturing a coated carrier according to an embodiment of the invention.

FIG. 2 is a flowchart showing a method of manufacturing the coated carrier according to an embodiment of the invention. The method of manufacturing the coated carrier of the embodiment includes a first resin layer forming step S1 of forming the first resin layer on the surface of the core particle containing a magnetic body, a resin particle layer forming step S2 of fixing a resin particle on the surface of the first resin layer in a partially-embedded state, and a second resin layer forming step S3 of forming the second resin layer so as to fill gaps between the resin particles.

An example of the method of manufacturing the coated carrier of the invention is shown below.

(1) First Resin Layer Forming Step S1

The first resin layer forming step S1 is a step of forming the first resin layer by coating the surface of the core particle containing a magnetic body with the first resin.

As a method of forming the first resin layer, known methods are usable. For example, there is an immersing method of preparing a raw material solution of the first resin layer by dissolving or dispersing raw materials such as resin and carbon black contained in the first resin layer in solvent such as toluene to immerse the core particle in this raw material solution.

Additionally, other than the above-mentioned method, a spraying method of spraying the raw material solution of the first resin layer to the core particle, a fluidized-bed method of spraying the raw material solution of the first resin layer in a state where the core particle is floated by fluidized air, a kneader-coater method of mixing the core particle and the raw material solution of the first resin layer in the kneader coater and then removing a solvent, or the like is usable. The immersing method is preferable among these methods since it is easy to form a film.

(2) Resin Particle Layer Forming Step S2

The resin particle layer forming step S2 is a step of forming a single-layer resin particle layer on the surface of the first resin layer by fixing the resin particle on the surface of the first resin layer in a partially-embedded state through mixing and agitating the core particle and the resin particle coated in the first resin layer.

For mixing the core particle and the resin particle, an agitation apparatus provided with an agitating blade, a V-type mixer or the like is usable. A rotating speed of the agitating blade or the V-type mixer may be a speed imparting shear force of the extent in which the resin particle can be fixed on the surface of the first resin layer in a partially-embedded state in a range where the core particle is not destroyed, for example, may be 20 to 60 rotations per minute.

Further, it is preferable that this step is performed in a state where some of the solvent contained in the raw material solution of the first resin layer is remained in order to facilitate fixation of the resin particle on the surface of the first resin layer.

Then, it is desirable that the carrier particle in which the resin particle is fixed on the surface of the first resin layer coating the core particle in a partially-embedded state is heated to harden the first resin layer in order to further strengthen fixation of the resin particle to the surface of the first resin layer. The first resin layer is thereby hard to be dissolved in a solvent such as toluene so that detachment of the resin particle can be prevented at the following second resin layer forming step S3.

(3) Second Resin Layer Forming Step S3

The second resin layer forming step S3 is a step of forming the second resin layer by coating the surface of the carrier particle in which the resin particle is fixed on the surface of the first resin layer in a partially-embedded state with the second resin layer to complete the coated carrier. At this step, gaps of the resin particle layer are filled with the second resin layer, the resin particle is held more firmly, as well as the surface of the carrier particle is made smooth.

As a method of forming the second resin layer, known methods are usable. For example, there is an immersing method of preparing a raw material solution of the second resin layer by dissolving or dispersing raw materials such as resin and carbon black contained in the second resin layer in solvent such as toluene to immerse the core particle in this raw material solution.

Additionally, other than the above-mentioned method, it is possible to use the same method as the above-described methods of forming the first resin layer. The immersing method is preferable among these methods since it is easy to form a film.

3. Various Physical Properties of Coated Carrier

The volume average particle size of the coated carrier is preferably 20 to 60 μm, and more preferably 30 to 50 μm. When the volume average particle size is less than 20 μm, the coated carrier adheres to a photoreceptor drum from a developing roller at the time of development so that a void of an image due to a transfer failure may occur. Additionally, when the volume average particle size is larger than 60 μm, dot reproducibility is deteriorated to cause a coarse image in some cases. Here, the volume average particle size of the coated carrier indicates a particle size of carrier particles in which the core particle is combined with the coating layer. Description will be given for a measuring method later.

Saturation magnetization of the coated carrier is preferably in a range of 30 to 100 emu/g, and more preferably in a range of 50 to 80 emu/g. The lower saturation magnetization of the coated carrier is, the softer a magnetic brush having contact with the photoreceptor drum is, and an image faithful to an electrostatic latent image is thus obtained. However, when saturation magnetization is less than 30 emu/g, the coated carrier adheres to the surface of the photoreceptor drum so that a void of an image due to a transfer failure is easy to occur. On the other hand, when saturation magnetization is larger than 100 emu/g, it is hard to obtain an image faithful to the electrostatic latent image since the magnetic brush becomes rigid. Description will be given for a measuring method later.

The electric resistivity of the coated carrier is preferably in a range of $3\times10^{9}$ to $5\times10^{12}\Omega$, and more preferably in a range of $2\times10^{10}$ to $5\times10^{11}\Omega$. When the electric resistivity is lower than $3\times10^{9}\Omega$, beads carry over to a photoreceptor and fogging of an image density are easy to occur, and when the electric resistivity is larger than $5\times10^{12}\Omega$, a charge amount of the toner is raised so that the image density is easy to be lowered. Description will be given for a measuring method later.

4. Two-Component Developer

The coated carrier of the invention is mixed with a toner and is used for a two-component developer. A mixing ratio is a ratio of 3 to 15 parts by weight of the toner based on 100 parts by weight of the coated carrier. The two-component developer can be manufactured by agitating the coated carrier and the toner with the V-type mixer.

<Toner>

The toner is not particularly limited and a known toner is usable. The toner contains a colored resin particle, and an external additive adhering to the surface of the colored resin particle as needed, and can be produced, for example, by mixing them by using an air flow mixer such as Henschel mixer, that is, performing an external addition process.

(Colored Resin Particle)

The colored resin particles can be produced by a known method such as a kneading/pulverizing method or a polymerization method.

In the case of producing the colored resin particles by the kneading/pulverizing method, a binder resin, a colorant, a charge control agent, a release agent, and other additives are mixed in a mixer such as HENSCHELMIXER, SUPERMIXER, MECHANOMILL and a Q-type mixer. The raw material mixture is melt-kneaded at a temperature of 100 to 180° C. by a kneader such as a biaxial kneader and a uniaxial kneader, an obtained kneaded material is cooled down to be solidified, and the solidified material is pulverized by an air pulverizer such as a jet mill. For a pulverized material obtained in this manner, particle size adjustment such as classification is performed as needed to obtain the colored resin particle.

The binder resin includes a styrene resin, an acrylic resin, and a polyester resin as publicly known. A linear or nonlinear polyester resin is especially preferable among these resins. The polyester resin is excellent in terms of enhancing mechanical strength of a toner (fine powder is hard to be generated), fixation properties (it is hard to be peeled off from paper after fixing), and hot offset resistance at the same time.

The polyester resin can be obtained by polymerizing a monomer composition composed of divalent or higher-valent polyalcohol and polybasic acid.

The divalent alcohol includes, for example: dials such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, and 1,6-hexanediol; bisphenol A alkylene oxide adduct such as bisphenol A, hydrogenated bisphenol A, polyoxyethylenated bisphenol A, and polyoxypropylenated bisphenol A; and the like.

The divalent polybasic acid includes, for example, maleic acid, fumaric acid, citraconic acid, itaconic acid, glutaconic acid, phthalic acid, isophthalic acid, terephthalic acid, cyclohexanedicarboxlic acid, succinic acid, adipic acid, sebacic acid, azelaic acid, malonic acid, and anhydrides of these acids, lower alkyl ester, or alkenyl succinic acids or alkyl succinic acids such as n-dodecenyl succinic acid or n-dodecyl succinic acid.

Additionally, trivalent or higher-valent polyalcohol or polybasic acid may be added in the monomer composition as needed.

The trivalent or higher-valent polyalcohol includes, for example: sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and the like.

The trivalent or higher-valent polybasic acid includes, for example, 1,2,4-benzenetricarboxylic acid, 1,2,5-benzenetricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, and anhydrides thereof.

As a colorant, known pigments or dyes commonly used for a toner are usable.

Examples of usable black colorant include carbon black and magnetite.

Examples of usable yellow colorant include: acetoacetic arylamide monoazo yellow pigments such as C.I. Pigment Yellow 1, C.I. Pigment Yellow 3, C.I. Pigment Yellow 74, C.I. Pigment Yellow 97, and C.I. Pigment Yellow 98; acetoacetic arylamide disazo yellow pigments such as C.I. Pigment Yellow 12, C.I. Pigment Yellow 13, C.I. Pigment Yellow 14, and C.I. Pigment Yellow 17; condensed monoazo yellow pigments such as C.I. Pigment Yellow 93 and C.I. Pigment Yellow 155; other yellow pigments such as C.I. Pigment Yellow 180, C.I. Pigment Yellow 150, and C.I. Pigment Yellow 185; and yellow dye such as C.I. Solvent Yellow 19, C.I. Solvent Yellow 77, C.I. Solvent Yellow 79, and C.I. Disperse Yellow 164.

Examples of usable red colorant include: red or bright red pigment such as C.I. Pigment Red 48, C.I. Pigment Red 49:1, C.I. Pigment Red 53:1, C.I. Pigment Red 57, C.I. Pigment Red 57:1, C.I. Pigment Red 81, C.I. Pigment Red 122, C.I. Pigment Red 5, C.I. Pigment Red 146, C.I. Pigment Red 184, C.I. Pigment Red 238, and C.I. Pigment Violet 19; and red dye such as C.I. Solvent Red 49, C.I. Solvent Red 52, C.I. Solvent Red 58, and C.I. Solvent Red 8.

Examples of usable blue colorant includes: blue dye and pigments of copper phthalocyanine and derivatives thereof such as C.I. Pigment Blue 15:3 and C.I. Pigment Blue 15:4; and green pigments such as C.I. Pigment Green 7 and C.I. Pigment Green 36 (phthalocyanine green).

The content of the colorant is preferably about 1 to 15 parts by weight, and more preferably a range of 2 to 10 parts by weight, based on 100 parts by weight of the binder resin.

As a charge control agent, known agents are usable.

Examples of a charge control agent imparting negative chargeability include: a chromium azo complex dye, an iron azo complex dye, a cobalt azo complex dye, a complex or salt compound of a salicylic acid or a derivative thereof with chromium, zinc, aluminum, or boron, a complex or salt compound of naphtholic acid or a derivative thereof with chromium, zinc, aluminum, or boron, a complex or salt compound of benzylic acid or a derivative thereof with chromium, zinc, aluminum, or boron, a long-chain alkyl carboxylate, and a long-chain alkyl sulfonate.

Examples of a charge control agent imparting positive chargeability include: a nigrosine dye and a derivative thereof, a triphenylmethane derivative, and derivatives such as a quaternary ammonium salt, a quaternary phosphonium salt, a quaternary pyridinium salt, a guanidine salt, and an amidine salt.

The content of these charge control agents is preferably in a range of 0.1 part by weight to 20 parts by weight, and more preferably in a range of 0.5 part by weight to 10 parts by weight, based on 100 parts by weight of the binder resin.

Examples of the release agent include: a synthetic wax such as polypropylene and polyethylene, a petroleum-based wax such as a paraffin wax and a derivative thereof, a microcrystalline wax and a derivative thereof, and a modified wax thereof, a vegetable wax such as a carnauba wax, a rice wax and a candelilla wax, and the like. By incorporating these release agents into a toner, the release properties of the toner with respect to a fixing roller or a fixing belt can be enhanced, and high-temperature/low-temperature offset upon fixing the toner can be prevented. The additive amount of the release agent is not particularly limited thereto, however, is commonly 1 part by weight or more and 5 parts by weight or less based on 100 parts by weight of the binder resin.

A volume average particle size of the colored resin particles is preferably in a range of 5 to 7 μm. In this range, an image excellent in the dot reproducibility, and having a high image quality with little fogging or toner scattering can be obtained.

(External Additive)

An external additive is preferably contained in the toner in order to prevent aggregation of a toner and prevent lowering of transfer efficiency of the toner to a recording medium from a photoreceptor drum.

As the external additive, inorganic particles composed of silica, titanium oxide, alumina and the like and having an average particle size of 7 to 100 nm are usable. Further, by subjecting the inorganic particle to a surface treatment with a silane coupling agent, a titanium coupling agent, or a silicone oil, hydrophobicity may be imparted. The inorganic particle on which the hydrophobicity is imparted is reduced in the lowering of electric resistance and a charge amount under high humidity. Particularly, a silica particle having a trimethylsilyl group introduced to the surface by using hexamethyldisilazane as the silane coupling agent, is excellent in hydrophobicity and insulating properties. A toner to which the silica particle is externally added can maintain excellent charging properties even under an environment of high humidity.

Examples of the external additive include: Aerosil 50 (about 30 nm number-average particle size), Aerosil 90 (about 30 nm number-average particle size), Aerosil 130 (about 16 nm number-average particle size), Aerosil 200 (about 12 nm number-average particle size), Aerosil 300 (about 7 nm number-average particle size) and Aerosil 380 (about 7 nm number-average particle size) manufactured by Nippon Aerosil Co., Ltd.; Aluminum Oxide C (about 13 nm number-average Particle size), Titanium Oxide P-25 (about 21 nm number-average particle size) and MOX170 (about 15 nm number-average particle size) manufactured by Degussa AG, Germany, TTO-51 (about 20 nm number-average particle size) and TTO-55 (about 40 nm number-average particle size) manufactured by ISHIHARA SANGYO KAISHA, LTD., silica (about 115 nm number-average particle size), (about 85 nm number-average particle size) manufactured by Cabot Corporation, Silica X-24 (about 110 nm number-average particle size) manufactured by Shin-Etsu Chemical Co., Ltd., and the like.

The additive amount of the external additive is preferably 0.2 to 3% by weight. In the case of less than 0.2% by weight, sufficient fluidity is unable to be given to the toner in some cases, and in the case of exceeding 3% by weight, the fixing property of the toner is lowered in some cases.

EXAMPLES

Measurement methods of a volume average particle size, saturation magnetization, electric resistivity, coverage and a number-average particle size in the invention are described below.

<Volume Average Particle Size of Coated Carrier>

The volume average particle size of the coated carrier was measured under the condition of 3.0 bar dispersive pressure by using a laser diffraction particle size analyzer: HELOS (manufactured by SYMPATEC, INC.) and a dry-type dispersing device: RODOS (manufactured by SYMPATEC, INC.).

<Volume Average Particle Size of Resin Particles>

The volume average particle size of resin particles was measured by using Coulter Multisizer II or Coulter Counter TA-II (manufactured by Beckman Coulter, Inc.) with a 100 μm aperture. As an electrolyte solution, an about 1% NaCl aqueous solution such as ISOTON R-II (manufactured by Beckman Coulter, Inc.), for example, is used. To 100 to 150 ml of an aqueous solution of the electrolyte solution, 0.1 to 5 ml of a surfactant, preferably alkylbenzene sulfonate, was added as a dispersant, and 2 to 20 mg of a sample was further added. The electrolyte solution in which the sample is suspended is subjected to a dispersion treatment using an ultrasonic disperser for about 1 to 3 minutes, the volume and the number of the toner was measured with a 100 μm aperture by using the measuring apparatus, from those values, the volume distribution and the number distribution were calculated and the volume average particle size was obtained.

<Saturation Magnetization>

The saturation magnetization was measured by VSMP-1 manufactured by Toei Industry Co., Ltd.

<Measurement of Electric Resistivity of Core Particle>

The electric resistivity of the core particle was measured in the same manner as measurement of the electric resistivity of the above-mentioned coated carrier. The core particle before being coated with the resin layer was set in a bridge-resistance measuring jig, current value at the time of applying voltage in which $1\times10^3$ (V/cm) electric field intensity is generated, and the electric resistivity (core particle electric resistivity) was calculated.

<Measurement of Electric Resistivity of Coated Carrier>

The electric resistivity of the coated carrier was measured under an environment of normal temperature and normal humidity by using a bridge-resistance measuring jig (1 mm distance between opposite electrodes, $40\times16$ mm$^2$ electrode measurement area). Specifically, 0.2 mg of the above-mentioned coated carrier weighed by an electronic balance or the like was inserted between the opposite electrodes of the bridge-resistance measuring jig, and a bridge of the coated carrier was formed between the opposite electrodes with a magnet. At that time, tapping was performed about 5 to 6 times in order to uniform the coated carriers between the bridges. After the coated carriers between the bridges were uniformed, voltage in which $4\times10^3$ (V/cm) electric field intensity is generated was applied, current value was measured by using a digital electrometer R834 (trade name, manufactured by ADVANTEST CORPORATION), and the electric resistivity (coated carrier electric resistivity) was calculated.

<Coverage>

Coverage was calculated by the following method. First, without deposition of a conductive agent such as gold on the core particle or the coated carrier surface, observation was performed using a scanning electron microscope (SEM) with an electron beam of acceleration voltage of 2.0 eV. The resin layer in the carrier was observed to be white by charging. A ratio of the white region to be observed relative to the total area of the carrier was then calculated. This determination was performed on 100 core particles or coated carriers, and an average value of the resulting values was taken as coverage.

<Number-Average Particle Size of Resin Particles>

For the number-average particle size of the resin particles, particle sizes of 100 resin particles were measured by using the scanning electron microscope, and whose average value was taken as the number-average particle size.

Coated carriers of Examples and Comparative Examples were produced by the following method.

Example 1

Core Particle

With a ball mill, 50 mol % of iron oxide, 35 mol % of manganese oxide, 14.5 mol % of magnesium oxide and 0.5 mol % of strontium oxide (manufactured by KDK Corporation) as raw materials of ferrite were pulverized for 4 hours to serve as a slurry. This slurry was dried in a spray drier, and the particle of the resulting spherical particle was calcined in a rotary kiln at 930° C. for 2 hours. The produced calcined powder was finely pulverized to an average particle size of 2 μm or less in a wet pulverizer using a steel ball as a pulverizing medium to serve as the slurry.

To this slurry, 2% by weight of polyvinyl alcohol was added, granulated, dried in the spray dryer, thereafter was fired in an electric furnace under conditions of a temperature of 1100° C. and an oxygen concentration of 0% by volume for 4 hours. Then, disintegration and classification were performed to obtain a core particle composed of a ferrite component having a volume average particle size of 39 μm and an electric resistivity of $2\times10^9\Omega$.

<First Resin Layer Forming Step>

A coating solution S1 for forming the first resin layer which coats the core particle was prepared by the following method.

In a flask substituted by nitrogen, 80 parts by weight of xylene were charged, and heated to a reflux temperature of xylene. Under xylene reflux, 45 parts by weight of styrene, 45 parts by weight of methyl methacrylate, 10 parts by weight of glycidyl methacrylate and 0.5 part by weight of di-t-butyl peroxide which had been blended and melted in advance were continuously added for 5 hours, and further reflux was continued for 1 hour. Then, the temperature in the flask was kept at 130° C., 0.5 part by weight of di-t-butyl peroxide was added to keep the reaction for 2 hours, thereafter finished, and a polymerized solution was obtained. This polymerized solution was flashed in a vessel of 10 mmHg at 160° C. to distill solvent and the like, and a glycidyl group-containing resin having a weight average molecular weight of 65000 and an epoxy equivalent weight of 500 g/Eq was obtained.

40 parts by weight of the glycidyl group-containing resin obtained in this manner was dissolved in 160 parts by weight of toluene, and a 20%-solution of glycidyl group-containing resin S1 was produced as the coating solution.

Next, 1000 parts by weight of core particles having a volume average particle size of 39 μm described above, 200 parts by weight of the above-described 20%-solution of glycidyl group-containing resin S1 and 1 part by weight of hexamethylenediamine as a cross-linking agent were inputted into an agitator provided with a heating jacket and an agitating blade and were mixed by rotating the agitating blade at 30 rotations per minute. Toluene was removed from the obtained mixture under reduced pressure and heating, and the first resin layer was formed on the surface of the core particle. The coverage of the core particle by the first resin layer was 100%. Note that, the amount of toluene remaining in the first resin layer at this time was 2500 ppm.

<Resin Particle Layer Forming Step>

A resin particle P1 for forming the resin particle layer was produced by the following method.

In a 3-L separable flask, 1600 g of isopropyl alcohol, 400 g of water and 20 g of polyacrylic acid were mixed, 60 g of methacrylic acid, 120 g of styrene, 20 g of divinylbenzene, 25 g of sodium styrenesulfonate and 10 g of azobisisobutyronitrile were added to the mixture, and polymerization reaction was performed for 12 hours at 80° C. under a nitrogen stream while agitating at 150 rpm.

The solution after the polymerization reaction was centrifugalised, separated particles were dried and white resin particles P1 were obtained.

The obtained resin particles P1 had a number-average particle size of 3 μm, and a particle content rate having a particle size of 0.8 times or more and 1.2 times or less as much as the number-average particle size was 95%.

Next, 4 parts by weight of the resin particle P1 and 1000 parts by weight of the core particle coated with the first resin layer were inputted into an agitator provided with a heating jacket and an agitating blade, and were mixed by rotating the agitating blade at 60 rotations per minute under a condition of a jacket temperature of 50° C. to form the resin particle layer. Thereafter, the first resin layer was hardened by heating at 200° C. for 1 hour, and a single-layer resin particle layer was formed on the surface of the core particle.

When the resin particle layer was observed by the electron microscope, the resin particle P1 was fixed on the surface of the first resin layer in a partially-embedded state, and the coverage of the surface of the core particle was 52%.

<Second Resin Layer Forming Step>

A coating solution S2 for forming the second resin layer was prepared by the following method.

| | |
|---|---|
| 20%-solution of glycidyl group-containing resin S1 | 400 parts by weight |
| Negative charge control agent (boron compound) (trade name: LR-147, manufactured by Japan Carlit Co., Ltd.) | 2 parts by weight |
| Conductive particles (conductive carbon black) (trade name: VULCANXC72, manufactured by Cabot Corporation) | 5 parts by weight |
| Cross-linking agent, hexamethylenediamine (manufactured by Wako Pure Chemical Industries, Ltd.) | 1 part by weight |

-continued

The mixture of the above-mentioned materials was agitated for 5 minutes by using a three-one motor, and the coating solution S2 was prepared.

Into the agitator provided with the heating jacket and the agitating blade, 406 parts by weight of the above-mentioned coating solution S2 and 1000 parts by weight of the core particle having the resin particle layer were inputted and were mixed by rotating the agitating blade at 30 rotations per minute. Toluene was removed from the obtained mixture under reduced pressure and heating, and the second resin layer was formed. Thereafter, the second resin layer was hardened by heating at 230° C. for 1 hour, then was passed through a 100-mesh sieve, and a coated carrier C1 was obtained. The amount of toluene remaining in the coated carrier was 60 ppm or less.

When the coated carrier C1 was observed by the electron microscope, the carrier surface was coated smoothly by the second resin layer, and the coverage was 100%. Additionally, when a cross-section of the coated carrier C1 was observed by a transmission electron microscope (TEM), a coating layer had uniform thickness of 3 μm, and a single-layer resin particle layer was formed. Further, as for the disintegrated surface, the coated carrier was observed by SEM, and the presence/absence of the core-exposed surface of a 10 micron or more was visually checked.

The coated carrier C1 had a volume average particle size of 45 μm, electric resistivity of $5\times10^{10}\Omega$ and saturation magnetization of 65 emu/g.

Examples 2, 3 and Comparative Examples 1 to 5

The coated carriers C2 to C8 shown in Table 1 were produced in the same manner as the coated carrier C1 except that the additive amount of the coating solution used for the first resin layer and the second resin layer was changed. The saturation magnetization of the coated carriers C2 to C8 was all 65 emu/g.

TABLE 1

| | | First resin layer | | | Resin particle | | | |
|---|---|---|---|---|---|---|---|---|
| | Coated carrier | Type | Additive amount (part by weight) | Coverage (%) | Type | Additive amount (part by weight) | Coverage (%) | Resin particle layer |
| Ex. 1 | C1 | S1 | 400 | 100 | P1 | 4.0 | 52 | Single layer |
| Ex. 2 | C2 | S1 | 400 | 100 | P1 | 3.1 | 40 | Single layer |
| Ex. 3 | C3 | S1 | 400 | 100 | P1 | 5.4 | 70 | Single layer |
| Comp. Ex. 1 | C4 | S1 | 400 | 100 | No type | — | — | No layer |
| Comp. | C5 | No | — | 0 | P1 | 4.0 | 52 | Disorder |

TABLE 1-continued

| | | | | | | | | |
|---|---|---|---|---|---|---|---|---|
| Ex. 2 | | type | | | | | | |
| Comp. Ex. 3 | C6 | S1 | 400 | 100 | P1 | 4.0 | 52 | Single layer |
| Comp. Ex. 4 | C7 | S1 | 400 | 100 | P1 | 10.0 | 100 | Disorder |
| Comp. Ex. 5 | C8 | S1 | 400 | 100 | No type | — | — | No layer |

| | Second resin layer | | | Physical properties | | |
|---|---|---|---|---|---|---|
| | Type | Additive amount (part by weight) | Coverage (%) | Volume average particle size (μm) | Electric resistivity (Ω) | Disintegrated surface |
| Ex. 1 | S2 | 406 | 100 | 45 | $5 \times 10^{10}$ | Not disintegrated |
| Ex. 2 | S2 | 406 | 100 | 45 | $3 \times 10^{10}$ | Not disintegrated |
| Ex. 3 | S2 | 406 | 100 | 45 | $7 \times 10^{10}$ | Not disintegrated |
| Comp. Ex. 1 | S2 | 406 | 100 | 43 | $3 \times 10^{10}$ | Disintegrated |
| Comp. Ex. 2 | S2 | 406 | 100 | 44 | $4 \times 10^{10}$ | Disintegrated |
| Comp. Ex. 3 | No type | — | 0 | 45 | $6 \times 10^{10}$ | Not disintegrated |
| Comp. Ex. 4 | S2 | 406 | 100 | 47 | $7 \times 10^{10}$ | Not disintegrated |
| Comp. Ex. 5 | No type | — | 0 | 43 | $2 \times 10^{10}$ | Not disintegrated |

<Toner>

Toners of Examples and Comparative Examples were produced by the following method.

| | |
|---|---|
| Binder resin (a polyester resin obtained by polycondensation of bisphenol A propylene oxide, terephthalic acid or anhydrous trimellitic acid as a monomer, glass transition temperature of 60° C., softening temperature of 125° C., manufactured by Fujikura Kasei Co., Ltd.) | 100 parts by weight |
| Colorant (carbon black) (trade name: MA100, manufactured by Mitsubishi Chemical Corporation) | 5 parts by weight |
| Charge control agent (boron compound) (trade name: LR-147, manufactured by Japan Carlit Co., Ltd.) | 2 parts by weight |
| Release agent (polypropylene wax) (trade name: 550P, manufactured by Sanyo Chemical Industries, Ltd.) | 3 parts by weight |

The above-mentioned toner materials were mixed by a Henschel mixer for 10 minutes, and thereafter a melt-kneading and dispersing process was conducted with a kneading/dispersing processor trade name: KNEADEX MOS 140-800, manufactured by Mitsui Mining Co., Ltd.). The kneaded material was coarsely pulverized with a cutting mill, and then, finely pulverized by a jet type pulverizer (trade name: IDS-2 type, manufactured by Nippon Pneumatic MFG. Co., Ltd.) The finely pulverized material was classified by a pneumatic classifier (trade name: MP-250 type, manufactured by Nippon Pneumatic MFG. Co., Ltd.) to obtain colored resin particles having a volume average particle size of 6.5 μm.

To 100 parts by weight of the obtained colored resin particles, 1 part by weight of a silica particle which was subjected to a surface treatment with hexamethyldisilazane having a number-average particle size of 12 nm (manufactured by Nippon Aerosil Co., Ltd.) and Silica X-24 having a number-average particle size of 110 nm (manufactured by Shin-Etsu Chemical Co., Ltd.) were added, followed by agitating by an air flow mixer (trade name: Henschel mixer, manufactured by Mitsui Mining Co., Ltd.) having set an end speed of the agitating blade to 15 m/sec for 2 minutes, and a negatively chargeable toner T1 was produced.

<Two-Component Developer>

The two-component developer of Examples and Comparative Examples was produced by inputting 6 parts by weight of the toner (T1) and 94 parts by weight for each of coated carriers (C1 to C8) into a Nauta mixer (trade name: VL-0, manufactured by Hosokawa Micron Corporation) to be agitated and mixed for 20 minutes.

<Printing Test>

For the produced two-component developer, a continuous printing test of 50K sheets was performed by using a digital multifunctional peripheral MXM-350 (manufactured by Sharp Corporation). As test paper, A4-sized electrophotographic paper: MULTI RECEIVER (manufactured by Sharp Document System Corporation) was used, and evaluation was performed for the following evaluation items.

(Image Density)

The density of an image sample was measured for each 5K sheets over initiation of printing to 50K sheets by a Macbeth reflection densitometer RD918 (manufactured by SAKATA INX ENG. CO., LTD.) As the image sample, a 3 cm-square solid image that was printed in one location of a center part on paper was used. In all image samples, having an image density of 1.3 or more was favorable (Good; state where fibers of the paper were completely covered by the toner), in any of the image samples, having an image density of 1.2 or more and less than 1.3 was sort of poor (Not bad), and in any of the image samples, having an image density of less than 1.2 was no good (Poor; state where fibers of the paper were not sufficiently covered by the toner).

(Fogging)

Whiteness W1 of a non-image area before printing and whiteness W2 of a non-image area after printing were measured by a whiteness checker: Z-Σ90 COLOR MEASURING SYSTEM (manufactured by NIPPON DENSHOKU INDUSTRIES CO., LTD.) by using the image sample printed for each 5K sheets over initiation of printing to 50K sheets, and a difference between them (W2−W1) was obtained as a fogging density. In all image samples, having a fogging density of less than 0.6 was favorable (Good; state where the fogging was hardly visible to the naked eye), in any of the image samples, having a fogging density of 0.6 or more and less than 1.0 was sort of poor (Not bad), and in any of the image samples, having a fogging density of 1.0 or more was no good (Poor; state where the fogging was clearly visible to the naked eye).

(Wear Resistance)

For wear resistance, the coated carrier after measuring an image density was observed by the electron microscope, and whether the coating resin layer was peeled off and the core particle was exposed was checked. The coating resin layer which was not peeled off was rated as "Good", and the coating resin layer in which the peeling was observed was rated as "Poor".

The printing test result is shown in Table 2.

TABLE 2

| | | Printing test | | |
|---|---|---|---|---|
| | Coated carrier | Image density (number of sheets when lowered) | Fogging (number of sheets in occurrence) | Wear resistance (number of sheets when peeling occurs) |
| Ex. 1 | C1 | Good | Good | Good |
| Ex. 2 | C2 | Good | Good | Good |
| Ex. 3 | C3 | Good | Good | Good |
| Comp. Ex. 1 | C4 | Poor (45K) | Poor (5K) | Poor (45K) |
| Comp. Ex. 2 | C5 | Poor (35K) | Poor (5K) | Poor (35K) |
| Comp. Ex. 3 | C6 | Poor (5K) | Poor (5K) | Poor (5K) |
| Comp. Ex. 4 | C7 | Poor (20K) | Poor (10K) | Poor (20K) |
| Comp. Ex. 5 | C8 | Poor (10K) | Poor (10K) | Poor (10K) |

In the coated carriers of Examples 1 to 3, there was no occurrence of disintegration on the surface, and the thickness of the coating layer was uniform. Further, there was no peeling and wearing in the coating layer even in the continuous printing test, and a stable image could be obtained over a long period of time.

On the other hand, in the coated carriers of Comparative Examples 1 and 2, the occurrence of disintegration on the surface was seen, and the thickness of the coating layer was non-uniform. Additionally, peeling and wearing of the coating layer were seen also in the continuous printing test, and the lowering of the image density and the occurrence of fogging were seen. In the coated carriers of Comparative Examples 3 and 4, the occurrence of disintegration on the surface was not seen, however, the thickness of the coating layer was non-uniform. Further, also in the continuous printing test, peeling and wearing of the coating layer were seen, and the lowering of the image density and the occurrence of fogging were seen. In the coated carrier of Comparative Example 5, the thickness of the coating layer was uniform, however, peeling and wearing of the coating layer were seen early in the continuous printing test, and the lowering of the image density and the occurrence of fogging were seen.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A coated carrier comprising:

a core particle including a magnetic body;

a first resin layer including a first resin having a first reactive group, the first resin layer coating the core particle;

a resin particle layer fixed to the first resin layer as a single layer, the resin particle layer being formed of resin particles comprising a crosslinking resin having a second reactive group which can undergo a cross-linking reaction with the first reactive group; and a second resin layer provided so as to fill gaps between the resin particles.

2. The coated carrier of claim 1, wherein the second resin layer includes a second resin having the first reactive group.

3. The coated carrier of claim 1, wherein one of the first resin having the first reactive group and the cross-linking resin having the second reactive group is an acrylic resin having a glycidyl group and the other thereof is an acrylic resin having a carboxyl group.

4. A method of manufacturing a coated carrier comprising:

a first resin layer forming step of forming a first resin layer including a first resin having a first reactive group, on a surface of a core particle including a magnetic body;

a resin particle layer forming step of forming a resin particle layer on a surface of the first resin by fixing resin particles comprising a cross-linking resin having a second reactive group which can undergo a cross-linking reaction with the first reactive group, to the first resin layer as a single layer; and a second resin layer forming step of providing a second resin layer so as to fill gaps between the resin particles.

5. The method of claim 4, wherein 90% or more by number of resin particles to be used have a particle size which is 0.8 times or more and 1.2 times or less as much as the number-average particle size.

* * * * *